UNITED STATES PATENT OFFICE.

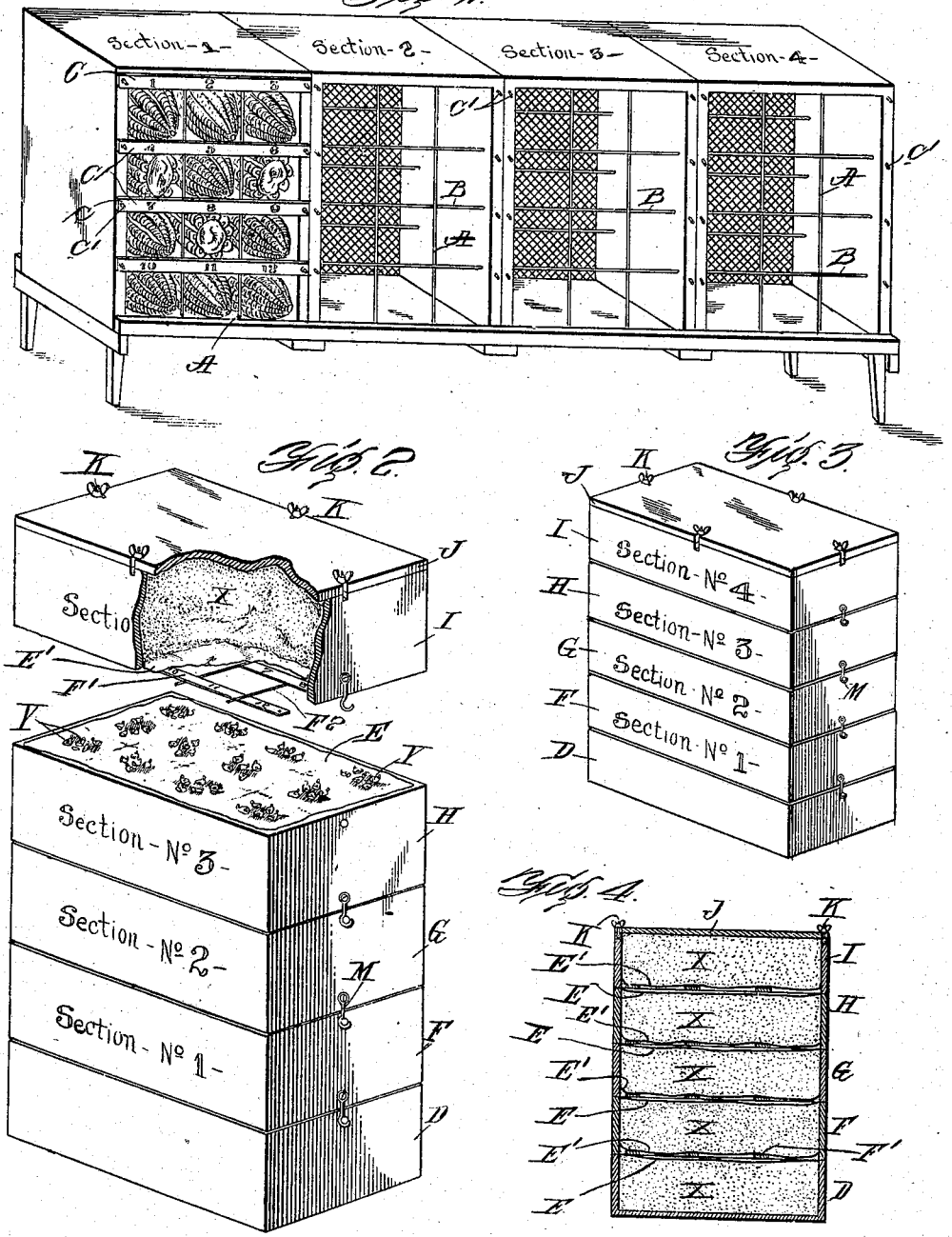

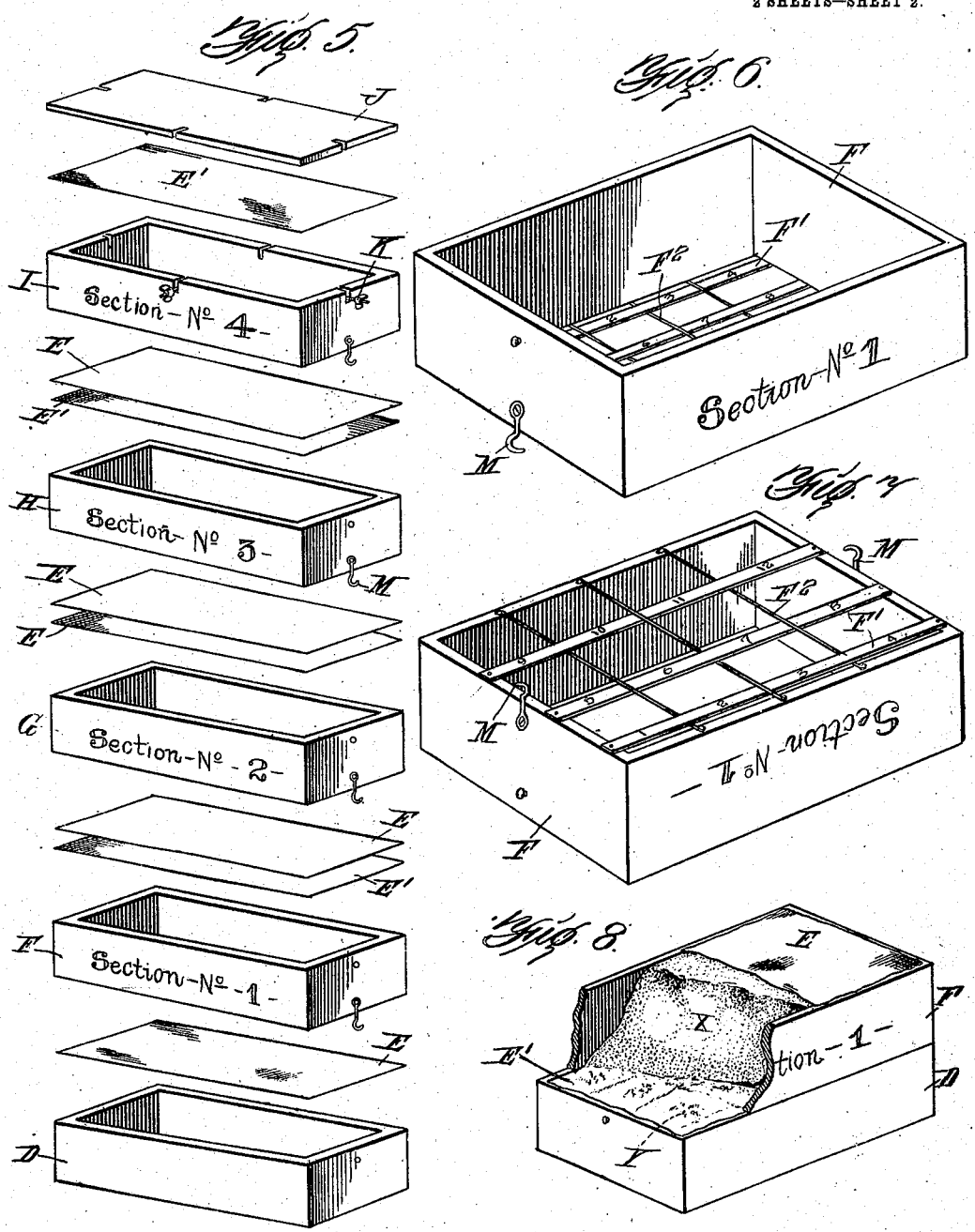

CLARK E. TWAMLY, OF ALEXANDRIA, SOUTH DAKOTA.

SEED-CORN TESTER.

No. 866,988.  Specification of Letters Patent.  Patented Sept. 24, 1907.

Application filed February 8, 1907. Serial No. 356,375.

*To all whom it may concern:*

Be it known that I, CLARK E. TWAMLY, a citizen of the United States of America, residing in Alexandria, in the county of Hanson and State of South Dakota, have invented certain new and useful Improvements in Seed-Corn Testers, of which the following is a specification.

In Letters Patent of the United States of America, No. 830,383, granted to me September 4, 1906, I have shown an apparatus for testing seed corn to determine which ears contain good seed or strong germs, or a large percentage of good seed or strong germs, and which contain such a small percentage as to render them unprofitable for use.
In the apparatus shown in said patent cribs are employed for holding the ears of corn in which the ears may be kept ventilated and dry, properly measured and marked for identification. In connection with the crib I show in said patent a germinating apparatus provided with means for causing good seed to germinate quickly. This apparatus, as shown, is provided with cups or receptacles in which samples of seed corn from a number of ears are placed, each cup being so marked that kernels of corn taken from a compartment in the crib bearing one number may be placed in a germinating cup bearing the same number and thus the value of the several ears of seed corn may be determined and recorded without confusion.

In my application for patent No. 350,463, filed January 2, 1907, I have shown an improvement on the apparatus of my patent by which means is provided for storing on a larger scale ears of seed corn and for germinating selected kernels on a larger scale.

The object of my present invention is to provide germinating apparatus of novel construction whereby seed corn in large quantities may be tested and caused to germinate properly and within a reasonable time, the construction of the apparatus being such that the expense of manufacture is considerably reduced and yet the kernels taken from one ear can be kept separate from those taken from other ears and can be readily identified so that it can be determined at any time from just what ear in the storing cribs the kernels were taken.
In carrying out my invention I employ a crib substantially the same in construction as that heretofore employed by me and the details of which are shown in my application for patent filed October 18, 1906, No. 339,467.
The germinating apparatus is of somewhat different construction from that heretofore employed. This apparatus comprises a series of sections separable from each other but which may be secured together and each of which contains a bed of sawdust or other suitable soil which is kept wet or moistened so as to produce a germinating atmosphere during the process. Each of these sections is divided into compartments by numbered strips and crossing wires, and pieces of cloth or similar material are employed to hold the sawdust in the sections. The details of construction of the improved germinating apparatus will be hereinafter more fully described.

In the accompanying drawings:—Figure 1 is a perspective view of a series of cribs in which the ears of corn are stored. Fig. 2 is a perspective view of the germinating apparatus with certain parts separated and parts broken away in order to better illustrate other parts. Fig. 3 is a perspective view of the germinating apparatus with all the parts assembled and locked together. Fig. 4 shows a vertical central section through the germinating apparatus. Fig. 5 is a diagrammatic view showing the different parts of the germinating apparatus separated and the sawdust beds omitted. Fig. 6 is a perspective view of one of the sections of the germinating apparatus looking downwardly into the section. Fig. 7 is a perspective view of the reverse side of the section shown in Fig. 6. Fig. 8 is a perspective view with parts broken away illustrating more particularly the arrangement of the sawdust beds, the cloths and the seed corn.

The crib shown in Fig. 1 is of the general construction shown in my application for patent filed October 18, 1906, above referred to. The crib is made in sections, four being shown in this instance arranged side by side and each marked to indicate its number. Each section is divided into compartments by crossed wires, A, B, and I provide a series of numbered strips, C, which are detachably connected with the crib section. In the particular arrangement shown, I employ four strips, C, each containing three numbers, there being a number on each strip for each compartment across which it is placed. Each section is shown as provided with twelve compartments and each strip has three numbers. Preferably the strips are perforated at c to receive pins c' projecting from the front face of the section. All of the sections of the cribs are provided with the pins c' and when seed has been taken from all of the ears in section 1, the strips may be readily transferred to section 2 to mark the compartments therein and after seed from the different ears in this section has been removed, the strips may be transferred to section 3, and so on. In this way I am enabled to use a relatively small number of numbered strips which is quite an item when it is considered that a hundred or more sections of cribs may be employed, and furthermore when a crib section contains the numbered strips it is known that seed corn is being taken from this section, and when a section is not provided with the strips, it is known that seed corn is not being taken from this section.

Referring now to the germinating apparatus, in my patent above referred to and in my pending application before mentioned, the germinating apparatus was either only adapted to test a relatively small quantity of seed, or the apparatus was comparatively expensive. By my present improvements, I largely reduce the expense of manufacture, thus bringing the apparatus within the reach of those unable to purchase or use the other apparatus. The apparatus is constructed of a series of boxes or sections which contain beds of a suitable soil or sawdust which is kept moist and on which the seed corn is placed.

Preferably the apparatus is constructed in the following way:—the bottom portion, D, is made in the form of a box closed everywhere except at the top. This is filled with sawdust, X, or other suitable substance which is leveled off even with the upper edge of the box and should be thoroughly moistened so as to produce a germinating atmosphere when the apparatus is heated. After the sawdust has been leveled off, I place a sheet of cloth or similar material, E, on top of the sawdust and the lower section of the apparatus is then ready to receive the next section thereof which is marked No. 1. This is closed on all four sides, but is open both at top and bottom. It is shown very clearly in Figs. 6 and 7. Across the bottom of the section No. 1, which is marked F, are arranged numbered strips, F', and these are crossed by wires, F², thus forming a series of compartments or spaces. In the present instance twelve such compartments or spaces are formed. It will be observed that the strips F', are numbered both on their upper and their lower sides so that the numbers of the compartments or spaces may be read when the section is right side up, or upside down. After the seed corn is placed in the manner hereinafter described, a cloth, E', is placed inside the section F on top of the strips, F', and the wires, F², in the manner shown in Fig. 4, and then a bed of sawdust or other suitable material, X, is placed on top of the cloth, E', and made to fill the section. The sawdust bed is then leveled off and is covered by a cloth, E. The sections G and H are precisely the same in construction as the section F. The section I is also similar to the sections F, G, and H, except that at the top I provide a cover, J, which is secured by fastening devices, K, to the sides of the section. These fastening devices, which are of well known construction, are such that the cover, J, may be firmly held in place, or it may be easily removed when desired. It will be understood that all of the beds, X, are saturated with water so as to produce a moistened atmosphere when the germinator is heated.

I have described the construction of the germinator, and I will now describe the manner in which the seed corn is introduced therein.

The section, F, also marked section No. 1, is placed immediately next the bottom section, D, (which is not numbered for reasons hereinafter specified) the bottom section D, being filled with sawdust or other suitable material and the cloth E being arranged thereon. Section No. 1, marked F, while empty, that is not containing the sawdust, X, or the cloth, E', is placed over section, D, and is secured thereto by means of fastening devices, M, of well known construction. When in this condition the numbered strips will be exposed and the several compartments formed by the strips and the crossing wires, will be readily seen. Seed corn from the several ears in the crib marked section 1, are then taken and placed in the spaces or compartments in section No. 1, the corn taken from compartment 1, in section 1 of the crib, being placed in the compartment numbered 1 of section 1 of the germinator and so on. After the several compartments in section 1 of the germinator have been supplied with seed corn from the several compartments in section 1 of the crib, the cloth E' is placed over the corn and over the strips and wires F', F², and then section No. 1 is filled with sawdust, then a cloth E is placed over the sawdust, and then section No. 2 is placed over section No. 1 and secured thereto, then seed corn from the ears in crib section No. 2 is placed in the several compartments of section No. 2 of the germinator, then a cloth E' is placed over the strips and wires F', F², and sawdust is placed in section No. 2 and this is covered with the cloth E, then section No. 3 is placed in position and so on. After all the sections have been filled and secured in this way, the cover is attached. The germinator may then be placed in a warm room or any suitable warm place and allowed to stand until a sufficient time has elapsed for germinating purposes.

While I have shown the germinator as consisting of four sections, obviously this number may be increased or diminished if desired. It is preferable, however, to use a limited number of sections and to secure them together in the manner specified so that they may be more easily moved from place to place.

Inasmuch as the seed corn is first placed in section No. 1, it may be desirable to inspect the seed in section No. 1 first, therefore the germinator may be turned upside down and the section D removed first with the cloth E. This will expose the seed corn in section No. 1 which will then be on the top of the cloth E', and as the strips F' are numbered on opposite sides, the numbers of the compartments will be indicated and it can be ascertained from just which ear of corn in the corresponding crib section the seed corn, Y, in any compartment of this section of the germinator has been taken.

My improved germinator may be cheaply made and easily handled. Preferably the boxes or casings are made of wood for the sake of cheapness, but they may be made of other material.

While my improved germinator is especially intended for testing seed corn, it may be employed for testing other kinds of seed.

What I claim is:—

1. A germinator comprising a series of sections arranged one above the other and each containing a germinating bed, numbered strips for dividing the bed into compartments, and sheets of cloth between which the seed is arranged and which separate adjacent beds.

2. A germinating apparatus comprising a series of sections each containing a germinating bed and each provided with numbered strips dividing the bed therein into compartments, a sheet of cloth arranged at the bottom of each bed, another sheet of cloth arranged at the top of each bed except the upper one, and a detachable cover for the top bed.

3. The combination of a series of crib sections each divided into compartments, each of which is numbered, and a germinator comprising a series of sections marked correspondingly with the crib sections, each section of the germinating apparatus comprising a germinating bed, numbered strips dividing the bed into compartments and sheets of cloth for confining the bed in the section.

4. In a germinating apparatus, a section having numbered strips dividing it into compartments, a sheet of cloth arranged over the strips, a germinating bed supported by the cloth, and a sheet of cloth on top of the bed on which the seed corn is placed.

5. In a germinating apparatus a section having strips dividing it into compartments which are numbered on opposite sides, a germinating bed within the section and means for confining the bed in the section.

6. In a germinating apparatus, a section having strips dividing it into compartments which are numbered on opposite sides, a sheet of cloth arranged over the strips, a germinating bed supported by the cloth, and a sheet of cloth on top of the bed on which the seed corn is placed.

In testimony whereof, I have hereunto subscribed my name.

CLARK E. TWAMLY.

Witnesses:
J. S. DESMOND,
W. H. RENFERS.